(12) United States Patent
Kim et al.

(10) Patent No.: US 11,323,987 B2
(45) Date of Patent: May 3, 2022

(54) METHOD FOR REPORTING TERMINAL CAPABILITY PERFORMANCE FOR DUAL CONNECTIVITY IN NEXT GENERATION COMMUNICATION SYSTEM AND APPARATUS THEREFOR

(71) Applicant: LG ELECTRONICS INC., Seoul (KR)

(72) Inventors: Youngtae Kim, Seoul (KR); Yunjung Yi, Seoul (KR); Hyunho Lee, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 16/772,139

(22) PCT Filed: Dec. 20, 2018

(86) PCT No.: PCT/KR2018/016379
§ 371 (c)(1),
(2) Date: Jun. 11, 2020

(87) PCT Pub. No.: WO2019/125021
PCT Pub. Date: Jun. 27, 2019

(65) Prior Publication Data
US 2021/0084642 A1    Mar. 18, 2021

Related U.S. Application Data

(60) Provisional application No. 62/609,274, filed on Dec. 21, 2017.

(51) Int. Cl.
*H04W 72/04*    (2009.01)
*H04L 5/00*    (2006.01)
(Continued)

(52) U.S. Cl.
CPC ....... *H04W 72/0413* (2013.01); *H04L 5/0032* (2013.01); *H04W 52/288* (2013.01);
(Continued)

(58) Field of Classification Search
None
See application file for complete search history.

(56) References Cited

U.S. PATENT DOCUMENTS 9,801,140 B2    10/2017   Yi et al.
2010/0260088 A1*   10/2010   Jeon ...................... H04L 12/189
                                                            370/312
(Continued)

FOREIGN PATENT DOCUMENTS

WO    2017195471    3/2019

OTHER PUBLICATIONS

OPPO, "Discussion on Remaining Issues for LTE-NT Dual Connectivity," 3GPP TSG-RAN WG1 #91, R1-1719989, Nov. 2017, 4 pages.
(Continued)

*Primary Examiner* — Nicholas Sloms
(74) *Attorney, Agent, or Firm* — Lee, Hong, Degerman, Kang & Waimey PC

(57) ABSTRACT

Disclosed in the present application is a method for transmitting a signal from a network by a terminal supporting dual connectivity between a first radio access technology (RAT) and a second RAT in a wireless communication system. Specifically, the method comprises the steps of: reporting, to the network, capability information including an information transmission time from a processor for the first RAT to a processor for the second RAT; receiving a first uplink grant for transmitting a first RAT uplink signal, and transmitting the first RAT uplink signal on the basis of the first uplink grant; and receiving a second uplink grant for (Continued)

transmitting a second RAT uplink signal, and transmitting the second RAT uplink signal on the basis of the second uplink grant.

10 Claims, 11 Drawing Sheets

(51) Int. Cl.
  *H04W 52/28* (2009.01)
  *H04W 72/12* (2009.01)
  *H04W 88/06* (2009.01)
(52) U.S. Cl.
  CPC ..... *H04W 72/048* (2013.01); *H04W 72/1284* (2013.01); *H04W 88/06* (2013.01)

(56) References Cited

U.S. PATENT DOCUMENTS

| | | | | |
|---|---|---|---|---|
| 2015/0208366 A1* | 7/2015 | Papasakellariou | .... | H04W 76/15 370/311 |
| 2016/0134402 A1* | 5/2016 | Park | .......... | H04L 27/2663 370/329 |
| 2016/0249243 A1* | 8/2016 | Kim | .......... | H04W 24/08 |
| 2017/0013565 A1* | 1/2017 | Pelletier | ............ | H04W 52/365 |
| 2018/0220470 A1* | 8/2018 | Zacharias | ............ | H04W 76/15 |
| 2018/0242234 A1* | 8/2018 | Semaan | ............ | H04W 72/0453 |
| 2019/0089498 A1* | 3/2019 | Pelletier | ............ | H04L 5/0053 |
| 2019/0141770 A1* | 5/2019 | Takahashi | ............ | H04W 8/24 |
| 2019/0159147 A1* | 5/2019 | Ryu | .......... | H04W 56/00 |
| 2021/0195574 A1* | 6/2021 | Hong | ............ | H04W 72/048 |

OTHER PUBLICATIONS

Qualcomm Incorporated, "Power sharing for LTE-NR dual connectivity," 3GPP TSG-RAN WG1 #90, R1-1713478, Aug. 2017, 3 pages.
Nokia, "On power sharing between LTE and NR in DC," 3GPP TSG-RAN WG1 #90, R1-1714097, Aug. 2017, 5 pages.
PCT International Application No. PCT/KR2018/016379, Written Opinion of the International Searching Authority dated Mar. 27, 2019, 15 pages.
European Patent Office Application Serial No. 18893182.8, Search Report dated Aug. 30, 2021, 8 pages.

* cited by examiner (A) CONTROL-PLANE PROTOCOL STACK (B) USER-PLANE PROTOCOL STACK

*-Prior Art-*

-Prior Art-

-Prior Art-

-*Prior Art*-

-Prior Art-

-Prior Art-

-Prior Art-

METHOD FOR REPORTING TERMINAL CAPABILITY PERFORMANCE FOR DUAL CONNECTIVITY IN NEXT GENERATION COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/016379, filed on Dec. 20, 2018, which claims the benefit of U.S. Provisional Application No. 62/609,274, filed on Dec. 21, 2017, the contents of which are all hereby incorporated by reference herein in their entirety.

TECHNICAL FIELD

The present disclosure relates to wireless communication system, and more particularly, to a method for reporting UE capability for dual connection in a next generation communication system and an apparatus therefor.

BACKGROUND ART

As more communication devices require greater communication traffic, necessity for a next generation 5G system corresponding to mobile broadband communication, which is enhanced compared to a legacy LTE system, is emerging. In the next generation 5G system, scenarios can be classified into Enhanced Mobile BroadBand (eMBB), Ultra-reliable Machine-Type Communications (uMTC), Massive Machine-Type Communications (mMTC), and the like.

The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

DISCLOSURE

Technical Problem

Based on the above-described discussion, an object of the present disclosure is to provide a method for reporting UE capability for dual connection in a next generation communication system and an apparatus therefor.

Technical Solution

In one aspect of the present disclosure, a method for transmitting a signal from a network by a UE supporting dual connectivity between a first radio access technology (RAT) and a second RAT comprises reporting, to the network, capability information including information on an information transmission time from a processor for the first RAT included in the UE to a processor for the second RAT included in the UE; receiving first uplink grant for transmitting a first RAT uplink signal and transmitting the first RAT uplink signal based on the first uplink grant; and receiving a second uplink grant for transmitting a second RAT uplink signal and transmitting the second RAT uplink signal based on the second uplink grant, wherein when the first RAT uplink signal and the second RAT uplink signal are transmitted at the same time, the first uplink grant and the second uplink grant are scheduled to simultaneously transmit the first RAT uplink signal and the second RAT uplink signal at a delay transmission time determined based on the information on the information transmission time.

In another aspect of the present disclosure, a method for receiving a signal by a network from a UE supporting dual connectivity between a first radio access technology (RAT) and a second RAT comprises receiving, from the UE, capability information including information on an information transmission time from a processor for the first RAT included in the UE to a processor for the second RAT included in the UE; transmitting a first uplink grant for receiving a first RAT uplink signal and receiving the first RAT uplink signal based on the first uplink grant, and transmitting a second uplink grant for receiving a second RAT uplink signal and receiving the second RAT uplink signal based on the second uplink grant, wherein when the first RAT uplink signal and the second RAT uplink signal are transmitted at the same time, the first uplink grant and the second uplink grant are scheduled to allow the UE to simultaneously transmit the first RAT uplink signal and the second RAT uplink signal at a delay transmission time determined based on the information on the information transmission time.

The processor for the first RAT of the UE delivers transmission power information of the first RAT uplink signal included in the first uplink grant to the processor for the second RAT of the UE, and the processor for the second RAT determines a transmission power of the second RAT uplink signal based on the transmission power information of the first RAT uplink signal when the first RAT uplink signal and the second RAT uplink signal are transmitted at the same time.

Additionally, the capability information may include information on a processing time of the second RAT uplink signal in the processor for the second RAT.

Preferably, a sum of the transmission power of the first RAT uplink signal and a transmission power of the second RAT uplink signal is smaller than or equal to a maximum transmission power of the UE when the first RAT uplink signal and the second RAT uplink signal are transmitted at the same time.

Preferably, the first RAT is long term evolution (LTE), and the second RAT is new RAT (NR).

Advantageous Effects

According to the embodiment of the present disclosure, UE capability for dual connection in a next generation communication system may be reported more efficiently, and a network may perform more efficient scheduling by using the UE capability reporting.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BEST MODE FOR CARRYING OUT THE DISCLOSURE

Figure 1:
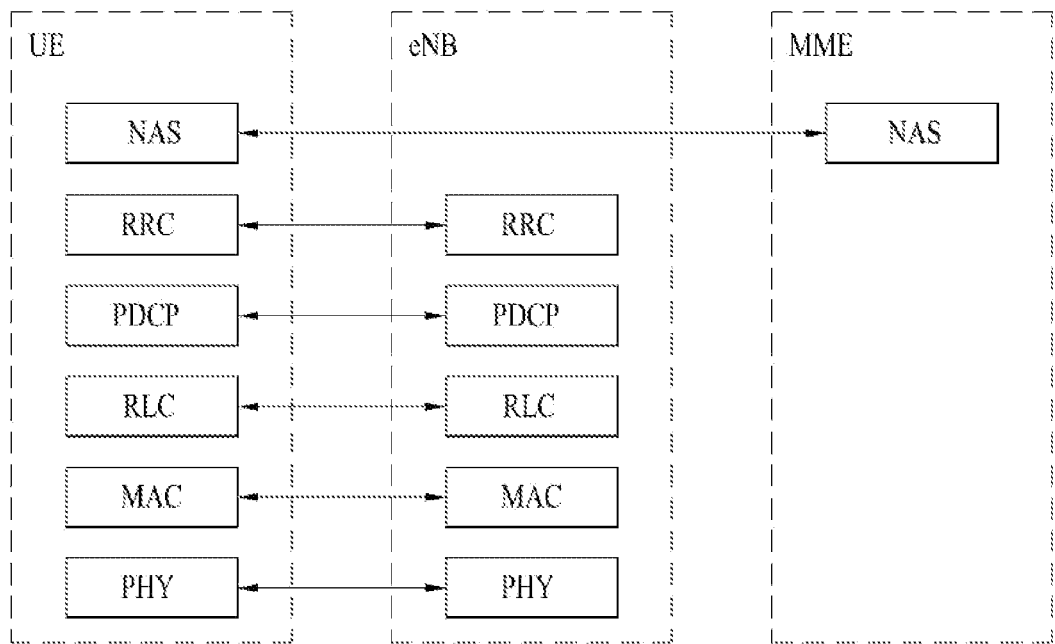
FIG. 1 is a diagram for structures of control and user planes of radio interface protocol between a 3GPP radio access network standard-based user equipment and E-UTRAN.
Figure 1:
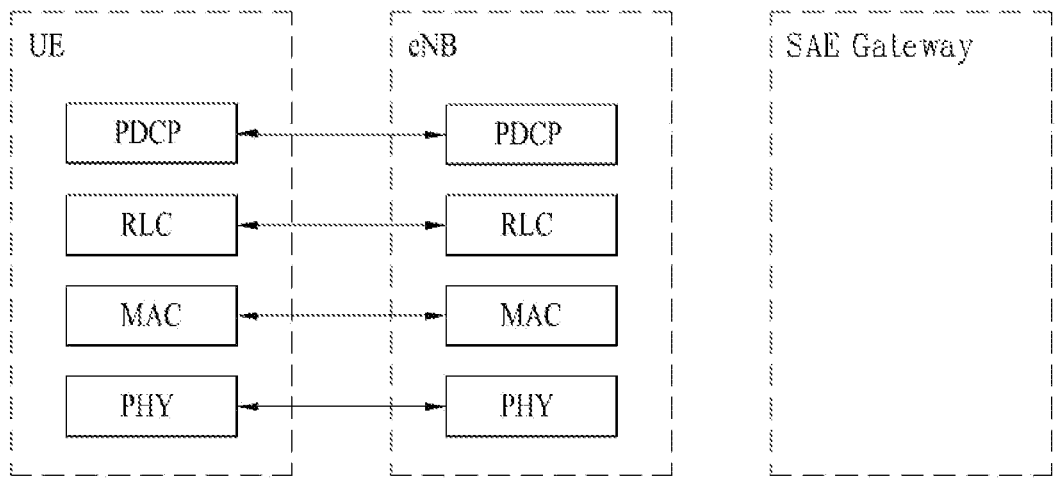

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 2:
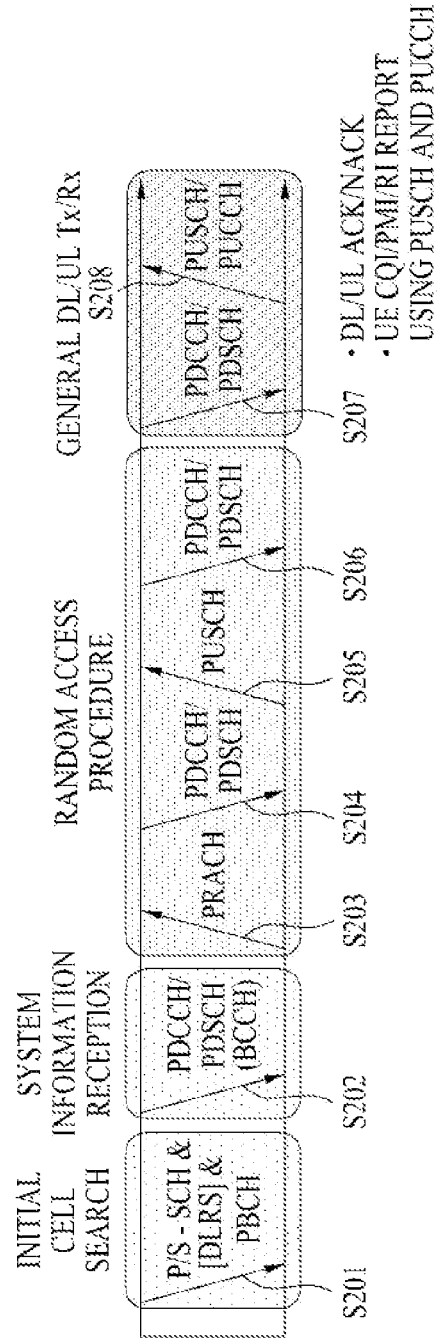
FIG. 2 is a diagram for explaining physical channels used for 3GPP system and a general signal transmission method using the physical channels.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
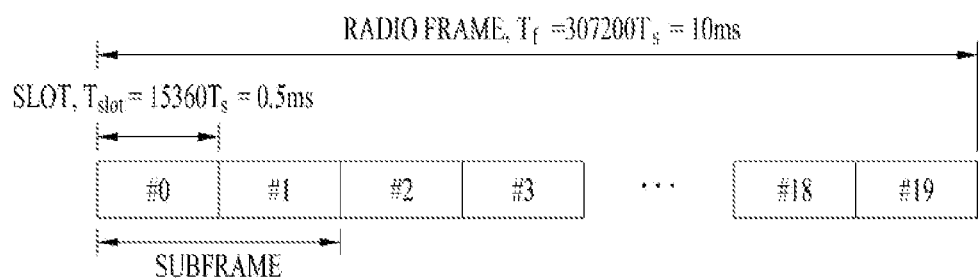
FIG. 3 is a diagram for a structure of a radio frame in LTE system.

FIG. 3 illustrates a structure of a radio frame used in the LTE system.

Referring to FIG. 3, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and $Ts=1/(15\ kHz \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
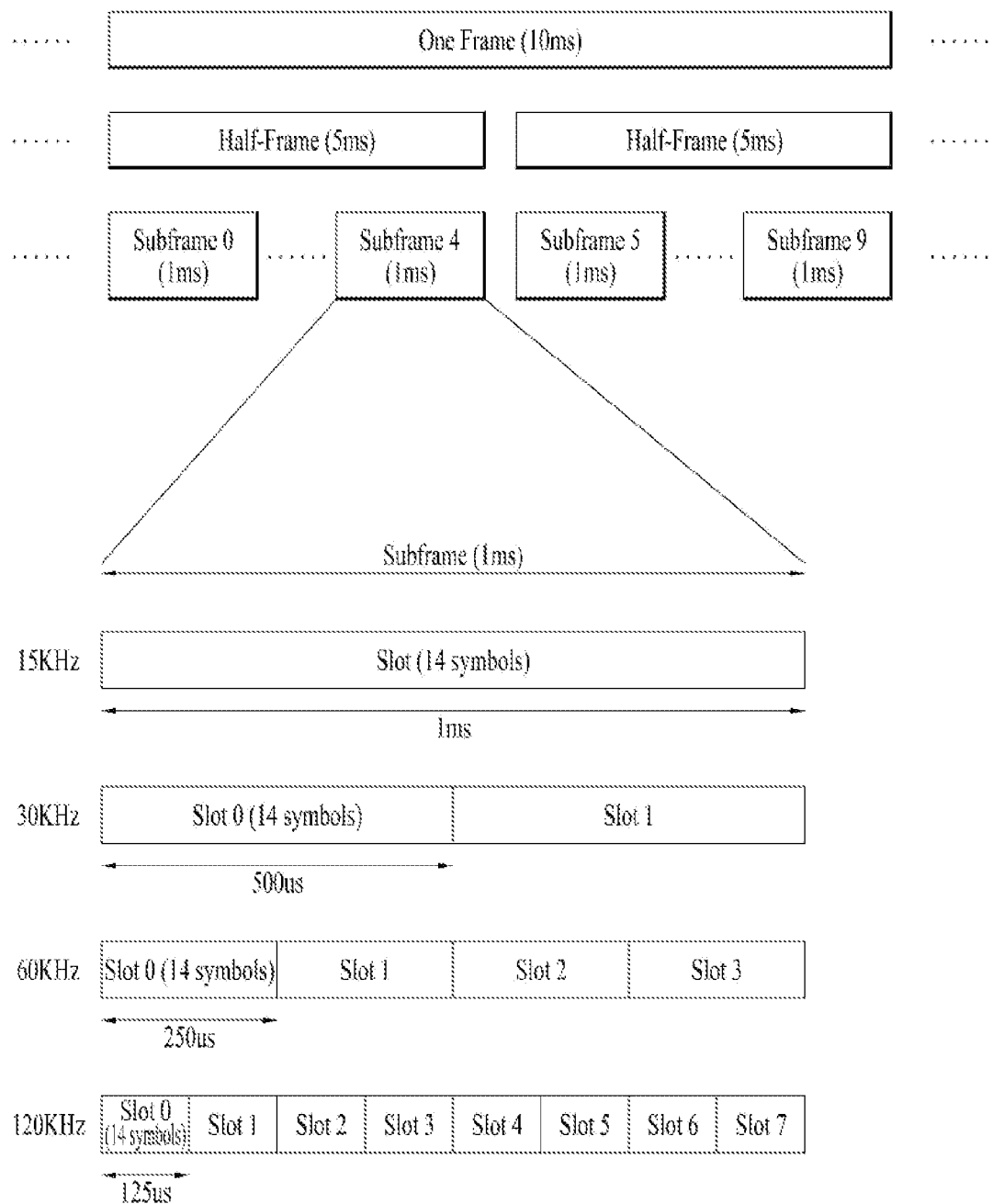
FIGS. 4 to 6 are views illustrating structures of a radio frame and slots used in the NR system.

FIG. 4 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 5:
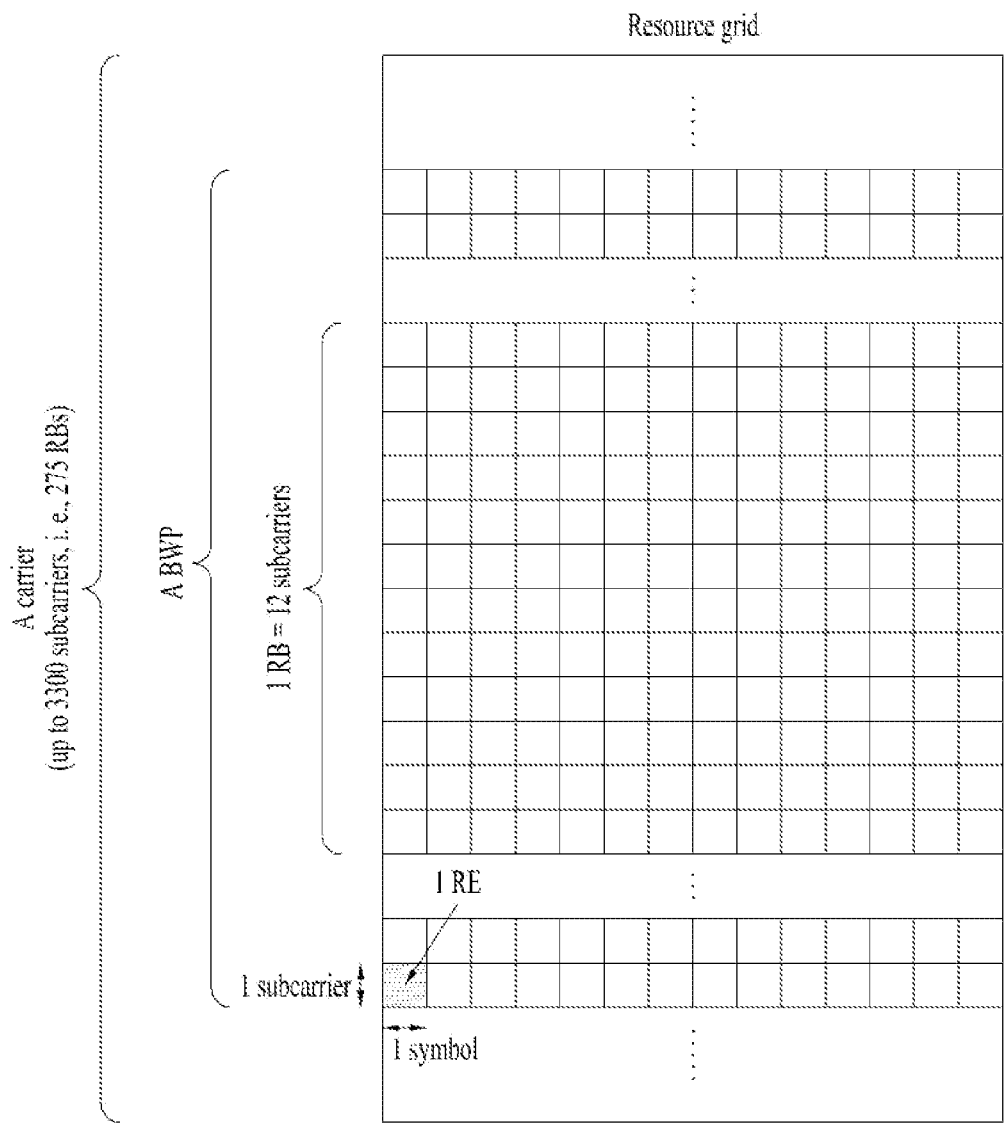

FIG. 5 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 6:
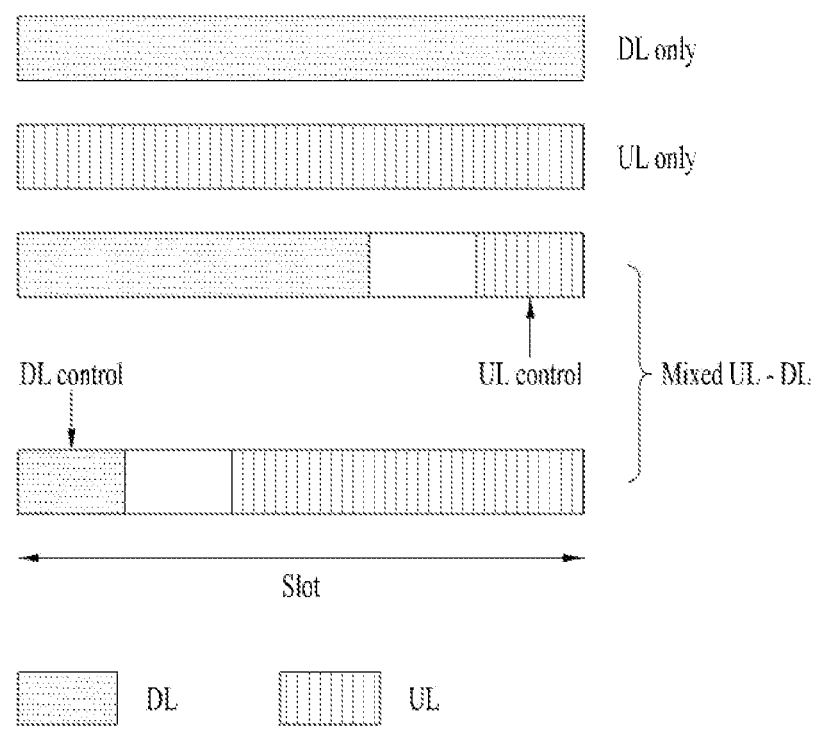

FIG. 6 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For NR system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 7:
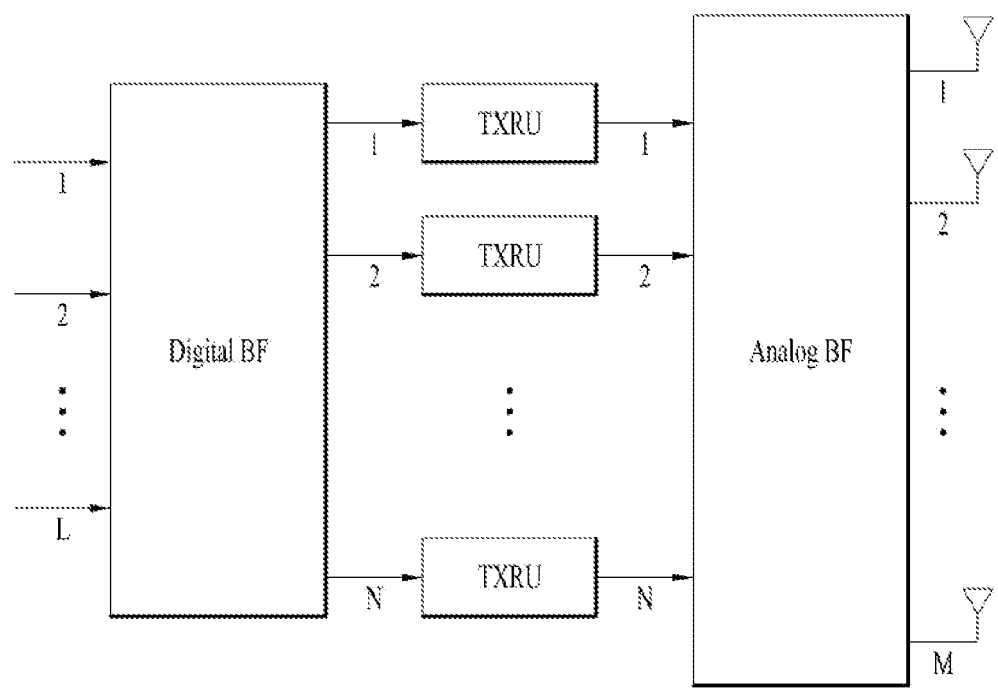
FIG. 7 is a view illustrating exemplary connection schemes between transceiver units (TXRUs) and antenna elements.

FIG. 7 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 7, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 8:
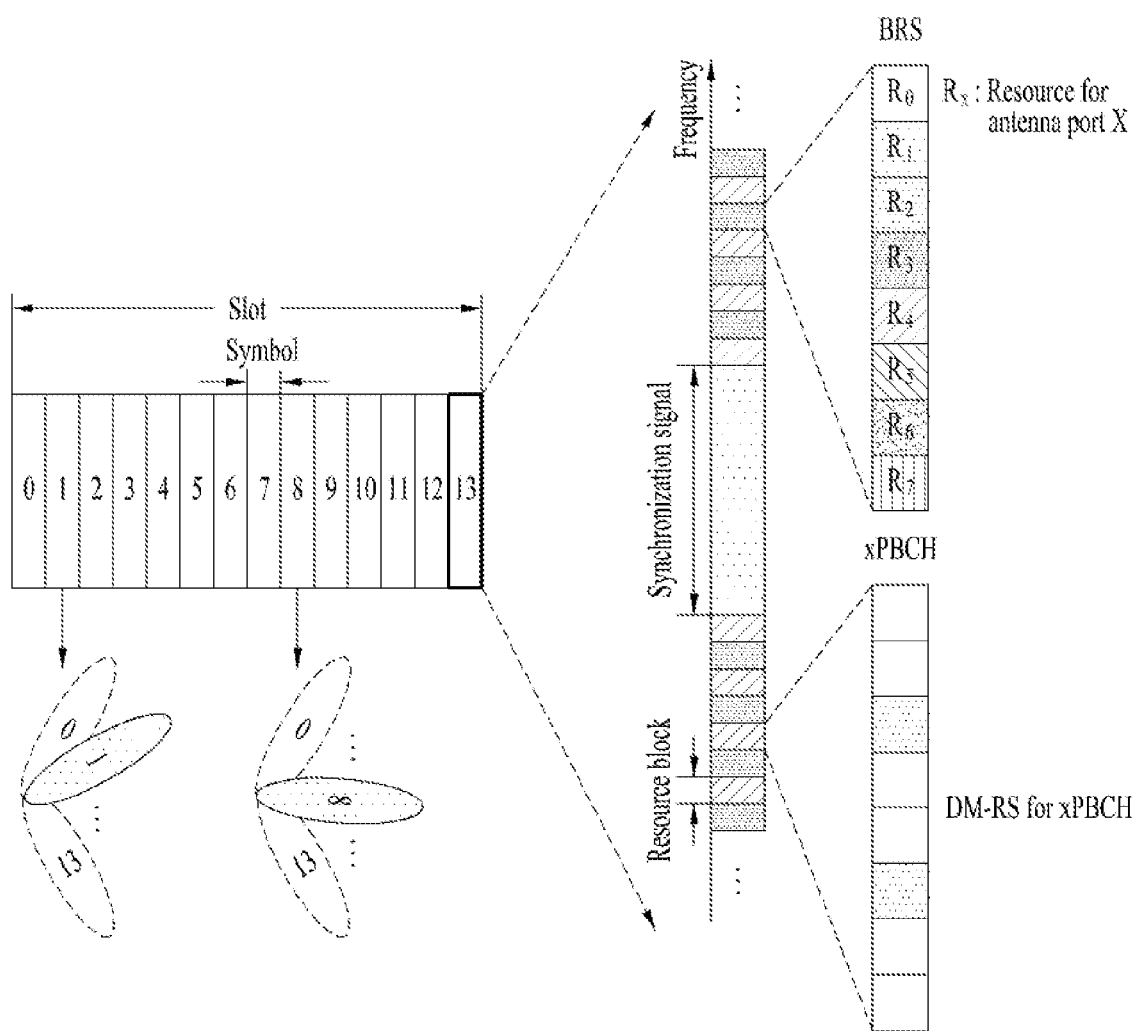
FIG. 8 is a view illustrating beam sweeping for a synchronization signal and system information during downlink (DL) transmission.

FIG. 8 is a view illustrating beam sweeping for an SS and system information during DL transmission.

In FIG. 8, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 8 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 9:
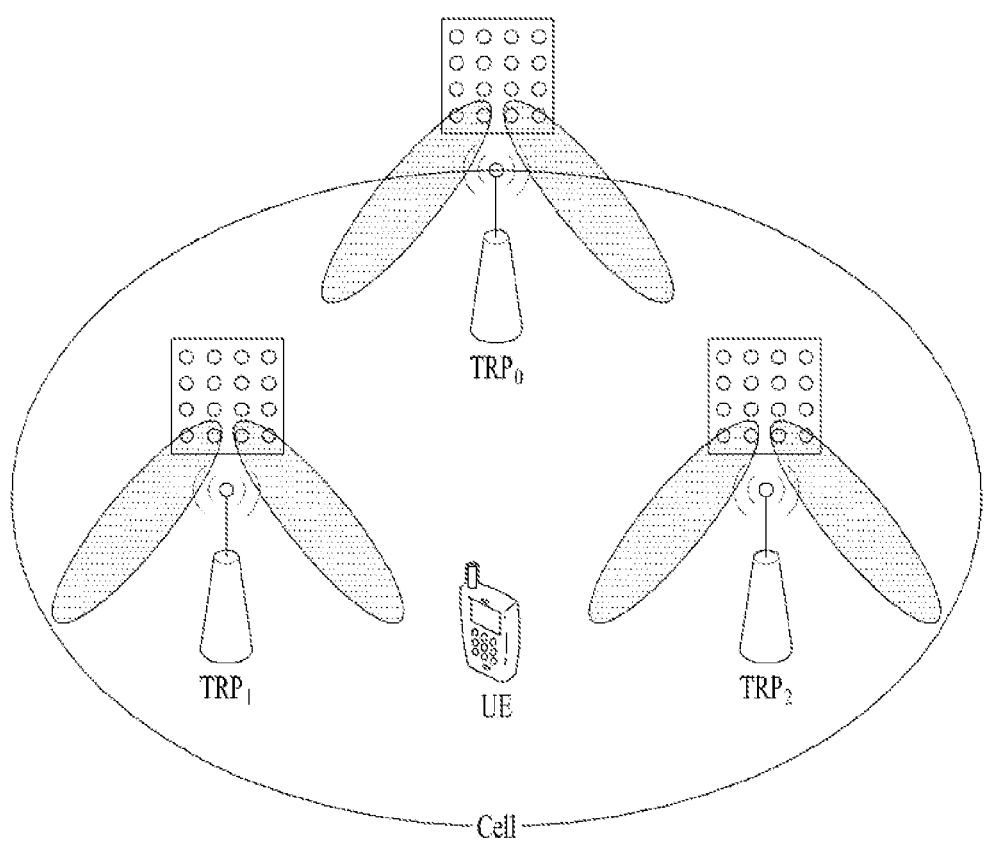
FIG. 9 is a view illustrating an exemplary cell in an NR system.

FIG. 9 is a view illustrating an exemplary cell in the NR system.

Referring to FIG. 9, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

The present disclosure relates to a case that a dynamic power sharing scheme between NR uplink signal and LTE uplink signal is applied in a dual connectivity (DC) status that a UE is simultaneously connected to NR eNB and LTE eNB. Particularly, the present disclosure relates to UE capability reporting in the above status.

At present, a dual connectivity (DC) scheme in which UE is simultaneously connected to NR eNB and LTE eNB is under discussion in the 3GPP standardization. At this time, in order to implement dynamic power sharing between NR uplink signal and LTE uplink signal, the UE needs to share information simultaneously scheduled from LTE system and NR system between LTE modem and NR modem.

Particularly, the 3GPP standardization aims to maintain capability of LTE uplink signal when the UE is simultaneously connected to the LTE system and the NR system. In view of power sharing, in case of simultaneous scheduling by the LTE system and the NR system, power reduction of NR uplink signal or dropping of NR uplink signal is under discussion. In this respect, if dynamic power sharing is applied, the LTE modem notifies the NR modem of scheduling information of the LTE uplink signal. Particularly, the LTE module should notify scheduling information and power information of the LTE uplink signal, whereby the NR modem previously excludes a power to be used for the LTE uplink signal from a whole power and uses the remaining power for the NR uplink signal.

Basically, the time required for the LTE modem to notify the NR modem of scheduling information and power information of the LTE uplink signal may be unique capability of the UE. Particularly, supposing that the time required to indicate the corresponding information is X ms, the LTE modem notifies the NR modem of scheduling information and power information of the LTE uplink signal for X ms immediately after identifying scheduling information of the LTE uplink signal through DCI, and starts to perform processing for the scheduled NR uplink signal (for example, ACK/NACK or PUSCH transmission) to correspond to an available power considering power information of the LTE uplink signal.

A portion to be first considered is a method for directly reporting X ms as UE capability. The eNB determines whether a processing time of the NR uplink signal will sufficiently be ensured from the time when the LTE uplink signal is scheduled to the time when the NR uplink signal and the LTE uplink signal are simultaneously transmitted, considering timing advance (TA) of the UE and a value of X. Based on this result, the eNB may intend to schedule simultaneous transmission of the NR uplink signal and the LTE uplink signal by performing uplink grant transmission for the NR uplink signal or PDSCH transmission that needs ACK/NACK response.

Alternatively, considering a processing time of PUSCH, PUCCH, SRS, etc. transmitted on uplink carriers that share a power, a processing time of uplink grant and downlink assignment transmitted from all downlink carriers may sufficiently be configured considering inter-chip latency of the UE.

Otherwise, considering inter-chip latency of the UE, a processing time of PDSCH-PUCCH or PDCCH-PUSCH may be set to K+m. In the LTE system, K may be a value based on that FDD is 4 msec and TDD is HARQ timing. Also, in the NR system, K may be a minimum value separately signaled, or may be a minimum value reported by the UE. That is, this means that a minimum timing value is increased as much as m. Since this should be applied among all UEs when Msg4/Msg3 is scheduled by a random access procedure, it is required to determine a timing of Msg4/Msg3 considering a maximum value of m of all UEs.

UE capability for X ms may be considered as a basic condition of dynamic power sharing. If the NR uplink signal and the LTE uplink signal should simultaneously be transmitted prior to X ms from the time when the LTE uplink signal is scheduled, a semi-static power sharing scheme may be applied. The semi-static power sharing may mean that a sum of powers of the NR uplink signal and the LTE uplink signal is set to a value that does not exceed PCmax when the NR uplink signal and the LTE uplink signal are scheduled to be simultaneously transmitted.

The semi-static power sharing is basically set for the UE through RRC signaling. Afterwards, the semi-static power sharing is always applied to the UE, and if the NR uplink signal and the LTE uplink signal should simultaneously be transmitted after X ms from the time when the LTE uplink signal is scheduled, a rule may be defined such that the dynamic power sharing is performed. For this operation, the LTE modem should notify the NR modem of scheduling information of the LTE uplink signal and power information for dynamic power sharing, and the NR modem should notify the LTE modem of the scheduling information of the NR uplink signal. This is because that it is required to determine whether to transmit the LTE uplink signal suitable for dynamic power sharing or semi-static power sharing. In this respect, the time required for the NR modem to notify the LTE modem of information and the time required for the LTE modem to notify the NR modem of information may together be considered by X ms. In other words, a maximum value of the two times may be notified to the eNB, and therefore the eNB may determine dynamic power sharing scheduled such that the NR uplink signal and the LTE uplink signal are simultaneously transmitted at a later time of X ms at the time when the LTE uplink signal is scheduled and X ms at the time when the NR uplink signal is scheduled.

In this case, it is assumed that the eNB should know whether LTE uplink signal transmission is performed to correspond to semi-static power sharing or dynamic power sharing. However, since the eNB should consider a processing time of the LTE uplink signal together with X ms, implementation may not be easy.

Therefore, the eNB may configure, to the UE, whether LTE uplink signal transmission should be performed based on semi-static power sharing or dynamic power sharing, through RRC signaling. If dynamic power sharing is configured, a network may perform scheduling such that the LTE uplink signal and the NR uplink signal may simultaneously be transmitted after X ms (that is, the time required for the LTE modem to transmit scheduling information and power information of the LTE uplink signal to the NR modem). Alternatively, the network may perform power control by assuming that a power is used as much as the existing power used in the corresponding uplink carrier.

For actual implementation of dynamic power sharing, the processing time of the NR uplink signal after X ms needs to be considered. This is because that processing of the NR uplink signal is required considering a power of the NR uplink signal as the power of the NR uplink signal is determined in accordance with power information of the LTE uplink signal notified from the LTE modem to the NR modem. This processing time may be considered as the time from the time when the power is actually required during signal processing to the time when processing ends, unlike the processing time defined in the legacy NR system. If this processing time is assumed as Y ms, the UE may report X+Y ms as UE capability, or may report (X, Y) ms as UE capability.

Y value may be defined as the time when processing ends from the time when an actual power value is required while the UE is processing PUSCH or processing A/N by receiving PDSCH. However, considering relaxation of UE for Y, Y value may be defined as the time when a transmission process of PUSCH ends from the time when uplink grant is delivered or the time when a transmission process of A/N ends immediately after PDSCH is received.

The network needs to perform scheduling such that the NR uplink signal and the LTE uplink signal are simultaneously transmitted after X+Y from the time when the LTE uplink signal is scheduled. If the network performs scheduling such that the NR uplink signal and the LTE uplink signal are simultaneously transmitted but it is temporally insufficient to transmit uplink grant of the NR uplink signal through power sharing with the LTE uplink signal in view of the UE, the UE may drop transmission of the NR uplink signal. Alternatively, among the signals scheduled to be simultaneously transmitted regardless of transmission of the NR uplink signal and the LTE uplink signal, the UE may drop the signal in which uplink grant occurs later. Also, since transmission on shortened TTI (sTTI) for latency reduction may be a situationally urgent message, a rule may be defined such that the UE may transmit the LTE uplink signal scheduled by sTTI and drop other transmission.

Priority based on this dropping rule may semi-statically be notified from the eNB to the UE through RRC signaling. The dropping rule may be considered in the order of LTE sTTI, LTE subframe TTI>NR. Considering that general LTE transmission is LTE subframe TTI, the dropping rule may be considered in the order of LTE subframe TTI>LTE sTTI>NR. Particularly, this is assumed that LTE sTTI and LTE subframe TTI are also scheduled to be transmitted together with the NR uplink signal. If LTE sTTI or LTE subframe TTI is only scheduled to be transmitted simultaneously with the NR uplink signal, a dropping rule priority may be defined in the order of LTE sTTI>NR or LTE subframe TTI>NR.

Meanwhile, since the aforementioned X+Y or (X, Y) value is related with the time when ACK/NACK or PUSCH transmission is performed after uplink grant is actually transmitted from the LTE eNB, considering general TTI, it may be identified whether X+Y or (X,Y) is smaller than or greater than 4 ms. Considering sTTI, it may be identified whether X+Y or (X,Y) is smaller than or greater than K. K is a scheduling timing value of HARQ and PDSCH in current sTTI, and becomes 4, 6, and 8 sTTI when ⅔ OFDM symbol sTTI is used in both downlink and uplink and becomes 4 sTTI when 1 slot sTTI is used in both downlink and uplink. When ⅔ OFDM symbol sTTI is used in downlink and 1 slot sTTI is used in uplink, ACK/NACK becomes 4, 6, and 8 downlink sTTI, and PUSCH becomes 4, 6, and 8 uplink sTTI.

This value may physically be converted to obtain K value as follows.

1 subframe TTI unit: 4 ms
Uplink/downlink 1 slot TTI unit: 2 ms
Uplink/downlink ⅔ symbol TTI unit: (600 us, 1 ms, 1.33 ms)
1 slot uplink TTI, ⅔ symbol downlink TTI unit HARQ timing: (600 us, 1 ms, 1.33 ms)
1 slot uplink TTI, ⅔ symbol downlink TTI unit PUSCH scheduling timing: 2 ms In view of UE capability, considering the above values, UE capability as to whether X+Y value or (X,Y) value is greater than or smaller than values of 0.6 ms, 1 ms, 1.33 ms, 2 ms, and 4 ms may be reported. Among five values, the smallest value that may be implemented by the UE may only be considered. This is because that the network may determine that K values more than the smallest value that may be implemented by the UE are all available in view of the aspect that the network should avoid K value of a random scheduling time.

In order to determine which sTTI is available, UE capability as to whether X+Y value or (X,Y) value is greater than or smaller than values of 0.6 ms, 2 ms, and 4 ms may be reported. Among five values, the smallest value that may be implemented by the UE may only be considered. This is because that the network may determine that K values more than the smallest value that may be implemented by the UE are all available in view of the aspect that the network should avoid K value of a random scheduling time.

Alternatively, in case of sTTI, a rule may be defined such that a sum of $P_{Cmax}$+NR $P_{Cmax}$ allocated to sTTI is always smaller than $P_{Cmax}$ of the UE regardless of the dynamic power sharing scheme.

If scheduling/HARQ timing of sTTI is slower than scheduling/HARQ timing of subframe TTI (for example, if grant is transmitted at a timing 'n' and ACK/NACK or PUSCH is transmitted at a timing 'n+K', K value may be set to a value of a threshold value or more in accordance with a format of sTTI. This K value may be set by RRC signaling), a rule may be defined such that dynamic power sharing may be applied to the LTE uplink signal and the NR uplink signal of sTTI. In this case, a necessary power may be given to transmission of high priority, transmission of low priority may be performed by the remaining power or may be dropped if the remaining power is not sufficient.

A corresponding power related priority may be configured in the order of LTE sTTI>LTE subframe TTI>NR by assuming that LTE uplink signal transmission is not affected by NR uplink signal transmission and sTTI transmission is urgent.

However, considering that LTE subframe TTI is general TTI, a priority may be defined in the order of LTE subframe TTI>LTE sTTI>NR. This power related priority may be set by RRC signaling. Also, this rule may correspond to the status that grant is delivered such that subframe TTI transmission and sTTI transmission are performed in the LTE system at the same time. If only LTE sTTI transmission is performed simultaneously with NR uplink signal transmission, LTE sTTI may be considered to have priority higher than NR transmission.

If dynamic power sharing is not performed, a rule may be defined such that a sum of $P_{Cmax}$+NR $P_{Cmax}$ allocated to sTTI is always smaller than UE $P_{Cmax}$. If LTE subframe TTI transmission is dropped to overlap sTTI transmission, $P_{Cmax}$ allowed in the LTE may be given to sTTI. In this way, when power is set semi-statically, all values of $P_{Cmax}$ of each transmission may be limited to $P_{Cmax}$ of PCell, and a power available in SCell may be set separately. If uplink grant is transmitted at a timing 'n' and ACK/NACK or PUSCH is transmitted at a timing 'n+K', dynamic power sharing may be difficult when K value is set to a value of a threshold value or less in accordance with a format of sTTI, whereby a rule may be defined such that semi-static power sharing defined as above is always performed.

When sTTI or processing time shortened scheme is configured in the LTE system, LTE-NR power sharing may be considered by the following options.

UE capability as to whether dynamic power sharing may be parallel with sTTI may be reported. Dynamic power sharing capability per sTTI length may be signaled UE-specifically, per band or per band-combination.

If dynamic power sharing is reported as UE capability, it may be assumed that dynamic power sharing for sTTI is supported.

Alternatively, it is assumed that a dynamic power sharing scheme is not applicable to sTTI and NR. It is assumed that a maximum power available in sTTI is set and is smaller than or equal to a maximum value of LTE power. Also, it is assumed that LTE-sTTI-power-max+NR-power-max<=$P_{CMax}$ is set.

Figure 10:
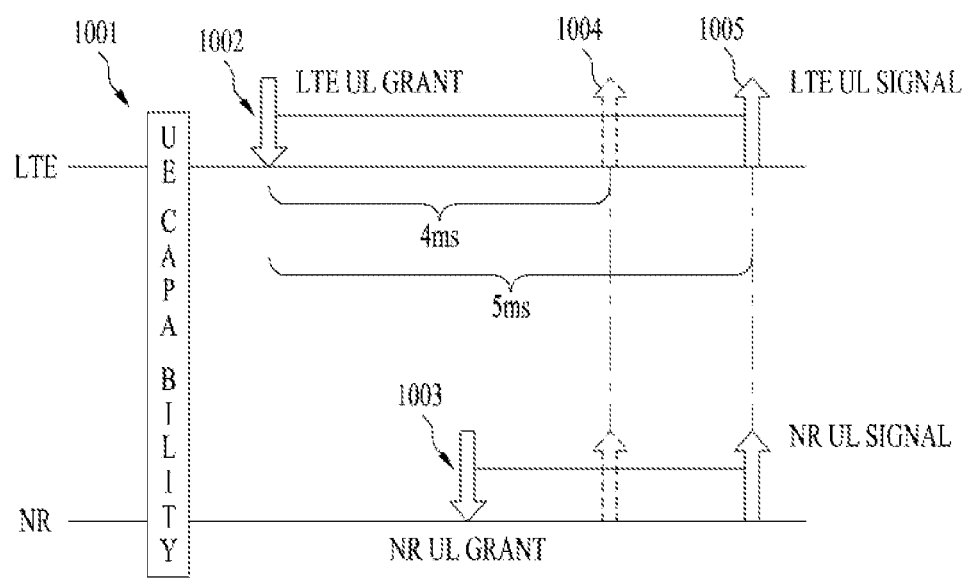
FIG. 10 illustrates that UE reports capability and therefore a network performs scheduling in accordance with the embodiment of the present disclosure.

FIG. 10 illustrates that UE reports capability and therefore a network performs scheduling in accordance with the embodiment of the present disclosure.

Referring to FIG. 10, the UE receives uplink grant 1002 for the LTE uplink signal from the network, and receives uplink grant 1003 for the NR uplink signal, wherein it is assumed that these signals are simultaneously transmitted at a first timing 1004.

According to the embodiment of the present disclosure, it is noted that the UE reports UE capability 1001 to the network. In this case, UE capability 1001 includes information on the time X required to notify scheduling information and power information of the LTE uplink signal from the LTE modem to the NR modem. In FIG. 10, for convenience of description, the time X required to notify scheduling information and power information of the LTE uplink signal from the LTE modem to the NR modem is assumed as a specific value of 1 ms or less.

In this status, for dynamic power sharing of the LTE uplink signal and the NR uplink signal, the time X is provided from the LTE modem to the NR modem, and processing is required correspondingly. Therefore, scheduling that reflects the processing is required. Therefore, it is preferable that the network changes the first timing 1004 to a second timing 1005 by reflecting the time X required to notify scheduling information and power information of the LTE uplink signal from the LTE modem to the NR modem through the uplink grant 1002 for the LTE uplink signal and the uplink grant 1003 for the NR uplink signal.

That is, the network performs scheduling to transmit the uplink signal after 5 ms not 4 ms from the time when uplink grant is received in view of the LTE uplink signal, and in view of the NR uplink signal, scheduling is performed such that the uplink signal is transmitted after 2 ms not 1 ms from the time when uplink grant is received. Dynamic power sharing is applied to the LTE uplink signal and the NR uplink signal, whereby the LTE uplink signal and the NR uplink signal are simultaneously transmitted.

Figure 11:
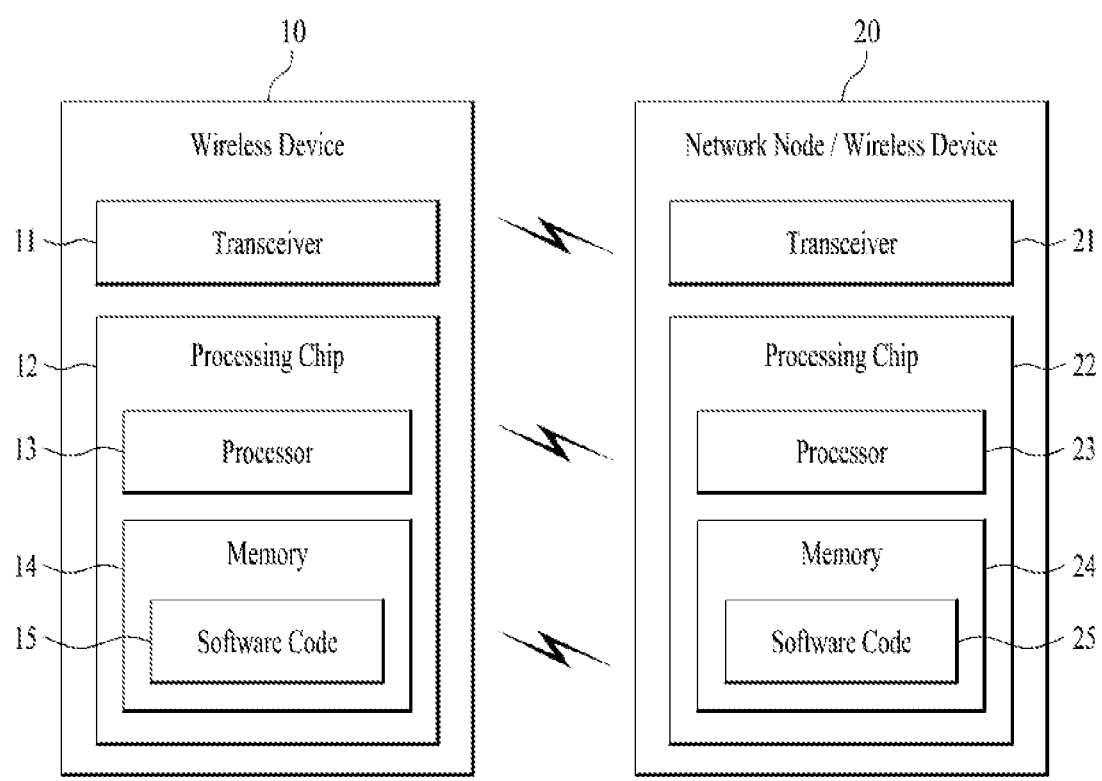
FIG. 11 is a block diagram of wireless devices for implementing the present disclosure.

FIG. 11 is a block diagram illustrating an example of communication between a wireless device 10 and a network node 20. Here, the network node 20 may be replaced with the wireless device of FIG. 11 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 7 to 9.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 11 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include Nt transmit antennas (where Nt is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 11, or store software codes 15 and 25 including instructions for implementing the embodiments described herein.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, 'BS' can be replaced by such a terminology as a fixed station, a Node B, an eNodeB (eNB), an access point and the like.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present disclosure can be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

INDUSTRIAL APPLICABILITY

Although the method for transmitting a control channel for multi-carrier support in a next generation communication system and an apparatus therefor have been described based on the 3GPP LTE system, the method and the device therefor are applicable to various wireless communication systems in addition to the 3GPP LTE system.

The invention claimed is:

1. A method for transmitting a signal to a network by a UE supporting dual connectivity between a first radio access technology (RAT) and a second RAT, the method comprising:
    reporting, to the network, capability information;
    receiving a first uplink grant for transmitting a first RAT uplink signal and transmitting the first RAT uplink signal based on the first uplink grant; and
    receiving a second uplink grant for transmitting a second RAT uplink signal and transmitting the second RAT uplink signal based on the second uplink grant,
    wherein the capability information includes a first time required to transfer information from a first processor for the first RAT included in the UE to a second processor for the second RAT included in the UE, and a second time for further processing by the second processor based on the transferred information,
    wherein the first uplink grant and the second uplink grant schedule the first RAT uplink signal and the second RAT uplink signal to be transmitted simultaneously at a delay transmission time after receiving the first uplink grant, and
    wherein the delay transmission time is determined to be equal to or greater than the sum of the first time and the second time based on the capability information.

2. The method of claim 1, further comprising delivering transmission power information of the first RAT uplink signal included in the first uplink grant from the processor for the first RAT to the processor for the second RAT based on the first uplink grant, wherein the processor for the second RAT determines a transmission power of the second RAT uplink signal based on the transmission power information of the first RAT uplink signal when the first RAT uplink signal and the second RAT uplink signal are transmitted at the same time.

3. The method of claim 1, wherein the capability information includes information on a processing time of the second RAT uplink signal in the second processor for the second RAT.

4. The method of claim 1, wherein a sum of the transmission power of the first RAT uplink signal and a transmission power of the second RAT uplink signal is smaller than or equal to a maximum transmission power of the UE when the first RAT uplink signal and the second RAT uplink signal are transmitted at the same time.

5. The method of claim 1, wherein the first RAT is long term evolution (LTE), and the second RAT is new RAT (NR).

6. A method for receiving a signal by a network from a UE supporting dual connectivity between a first radio access technology (RAT) and a second RAT, the method comprising:
    receiving, from the UE, capability;
    transmitting a first uplink grant for receiving a first RAT uplink signal and receiving the first RAT uplink signal based on the first uplink grant; and
    transmitting a second uplink grant for receiving a second RAT uplink signal and receiving the second RAT uplink signal based on the second uplink grant,
    wherein the capability information includes a first time required to transfer information from a first processor for the first RAT included in the UE to a second processor for the second RAT included in the UE, and a second time for further processing by the second processor based on the transferred information, wherein the first uplink grant and the second uplink grant schedule the first RAT uplink signal and the second RAT uplink signal to be transmitted simultaneously at a delay transmission time after receiving the first uplink grant, and wherein the delay transmission time is determined to be equal to or greater than the sum of the first time and the second time based on the capability information.

7. The method of claim 6, further comprising delivering transmission power information of the first RAT uplink signal included in the first uplink grant from the processor for the first RAT to the processor for the second RAT, wherein the processor for the second RAT determines a transmission power of the second RAT uplink signal based on the transmission power information of the first RAT uplink signal when the first RAT uplink signal and the second RAT uplink signal are transmitted at the same time.

8. The method of claim 6, wherein the capability information includes information on a processing time of the second RAT uplink signal in the second processor for the second RAT.

9. The method of claim 6, wherein a sum of the transmission power of the first RAT uplink signal and a transmission power of the second RAT uplink signal is smaller than or equal to a maximum transmission power of the UE when the first RAT uplink signal and the second RAT uplink signal are transmitted at the same time.

10. The method of claim 6, wherein the first RAT is long term evolution (LTE), and the second RAT is new RAT (NR).

* * * * *